United States Patent
Okajima

(10) Patent No.: US 12,239,926 B2
(45) Date of Patent: Mar. 4, 2025

(54) FILTER ATTACHMENT BODY AND WORK VEHICLE

(71) Applicant: KOMATSU LTD., Tokyo (JP)

(72) Inventor: Kazumichi Okajima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 811 days.

(21) Appl. No.: 17/426,911

(22) PCT Filed: Mar. 17, 2020

(86) PCT No.: PCT/JP2020/011729
§ 371 (c)(1),
(2) Date: Jul. 29, 2021

(87) PCT Pub. No.: WO2020/189680
PCT Pub. Date: Sep. 24, 2020

(65) Prior Publication Data
US 2022/0096973 A1 Mar. 31, 2022

(30) Foreign Application Priority Data
Mar. 19, 2019 (JP) .................................. 2019-051088

(51) Int. Cl.
*B01D 35/02* (2006.01)
*B01D 35/30* (2006.01)
(Continued)

(52) U.S. Cl.
CPC ............. *B01D 35/02* (2013.01); *B01D 35/30* (2013.01); *E02F 9/0858* (2013.01); *F16M 13/02* (2013.01);
(Continued)

(58) Field of Classification Search
CPC .. B01D 35/02; B01D 35/30; B01D 2201/265; B01D 2201/40; E02F 9/0858; E02F 3/283; F16M 13/02
See application file for complete search history.

(56) References Cited

U.S. PATENT DOCUMENTS

2013/0259596 A1   10/2013   Nambara et al.
2014/0219739 A1   8/2014    Hirayama
2018/0087478 A1   3/2018    Matsumiya et al.

FOREIGN PATENT DOCUMENTS

CN    103363014 A    10/2013
CN    103967916 A    8/2014
(Continued)

OTHER PUBLICATIONS

The Office Action for the corresponding Chinese application No. 202080012627.2, issued on Apr. 28, 2022.
(Continued)

*Primary Examiner* — Youngsul Jeong
(74) *Attorney, Agent, or Firm* — Global IP Counselors, LLP

(57) ABSTRACT

A filter attachment body is attached to a vehicle body of a work vehicle provided with a pump. The filter attachment body includes a bracket attached to the vehicle body, a filter device attached to the bracket, and a plurality of elastic members interposed between the bracket and the filter device. The bracket has an attachment plate to which the filter device is attached. The attachment plate is disposed substantially perpendicular to an up-down direction. The filter device has a filter case connected to the pump, and a filter body attached to the filter case. A geometric center of the filter body overlaps a figure drawn by linking the elastic members with straight lines when viewed from a top view of the attachment plate. At least a portion of at least one of the
(Continued)

elastic members is located outside of the filter body when viewed from the top view.

5 Claims, 6 Drawing Sheets

(51) Int. Cl.
*E02F 3/28* (2006.01)
*E02F 9/08* (2006.01)
*F16M 13/02* (2006.01)

(52) U.S. Cl.
CPC .... *B01D 2201/265* (2013.01); *B01D 2201/40* (2013.01); *E02F 3/283* (2013.01)

(56) References Cited

FOREIGN PATENT DOCUMENTS

| | | | | |
|---|---|---|---|---|
| CN | 206738318 U | | 12/2017 | |
| JP | 56-110820 U | | 8/1981 | |
| JP | S56110820 U | * | 8/1981 | |
| JP | 57-19215 U | | 2/1982 | |
| JP | S57-19215 U | * | 2/1982 | ............. F16B 43/00 |
| JP | 2000-87945 A | | 3/2000 | |
| JP | 2006-188118 A | | 7/2006 | |
| JP | 2018-53811 A | | 4/2018 | |

OTHER PUBLICATIONS

The International Search Report for the corresponding international application No. PCT/JP2020/011729, issued on Jun. 9, 2020.

* cited by examiner

FILTER ATTACHMENT BODY AND WORK VEHICLE

CROSS-REFERENCE TO RELATED APPLICATIONS

This application is a U.S. National stage application of International Application No. PCT/JP2020/011729, filed on Mar. 17, 2020. This U.S. National stage application claims priority under 35 U.S.C. § 119(a) to Japanese Patent Application No. 2019-051088, filed in Japan on Mar. 19, 2019, the entire contents of which are hereby incorporated herein by reference.

BACKGROUND

Field of the Invention

The present invention relates to a filter attachment body and a work vehicle.

Background Information

Conventionally, a work vehicle (such as a wheel loader or a forklift) is provided with a pump (such as a hydraulic fluid pump or a fuel pump) for discharging a fluid and a filter device for filtering the fluid. The filter device is attached to the vehicle body.

A pulsation when the pump discharges the fluid is transmitted not only as noise to an operator sitting in the operator's seat due to solid propagation from the filter device through the vehicle body to the operator's seat, but also is transmitted as noise outside the work vehicle due to air-borne propagation of the pulsation of the filter device itself.

Accordingly, Japanese Patent Laid-open No. 2006-188118 proposes a method for suppressing noise caused by the pulsation of the pump by interposing an elastic member between a bracket attached to the vehicle body frame and the filter device attached to the bracket.

SUMMARY

However, further improvement is desired in the method of Japanese Patent Laid-open No. 2006-188118 since the elastic member is likely to be partially compressed and unable to sufficiently suppress the noise.

An object of the present invention is to provide a filter attachment body that can suppress noise caused by pulsation of a pump, and to provide a work vehicle.

A filter attachment body is attached to a vehicle body of a work vehicle provided with a pump. The filter attachment body comprises a bracket attached to the vehicle body, a filter device attached to the bracket, and a plurality of elastic members interposed between the bracket and the filter device. The bracket has an attachment plate to which the filter device is attached. The attachment plate is disposed substantially perpendicular to the up-down direction. The filter device has a filter case connected to the pump, and a filter body attached to the filter case. A geometric center of the filter body overlaps a figure drawn by linking each of the plurality of elastic members with straight lines when viewed from a top view of the attachment plate. At least a portion of at least one elastic member among the plurality of elastic members is located outside of the filter body when viewed from the top view of the attachment plate.

According to the present invention, there are provided a filter attachment body that can suppress noise caused by pulsation of a pump, and a work vehicle.

DETAILED DESCRIPTION OF EMBODIMENT(S)

A wheel loader 1 according to an embodiment of the present invention will be explained below with reference to the drawings. The wheel loader 1 is an example of a "work vehicle" according to the present invention. In the following explanations, "up," "down," "front," "rear," "left," and "right" indicate directions relative to the state of looking forward from the driver's seat. The "front-back direction" signifies the front-back direction of the vehicle. The "vehicle width direction" signifies the left-right direction of the vehicle. The "up-down direction" signifies the vertical direction of the vehicle and a direction perpendicular to the vehicle width direction. The "up-down direction" may not coincide with the vertical direction.

Wheel Loader 1

Figure 1:
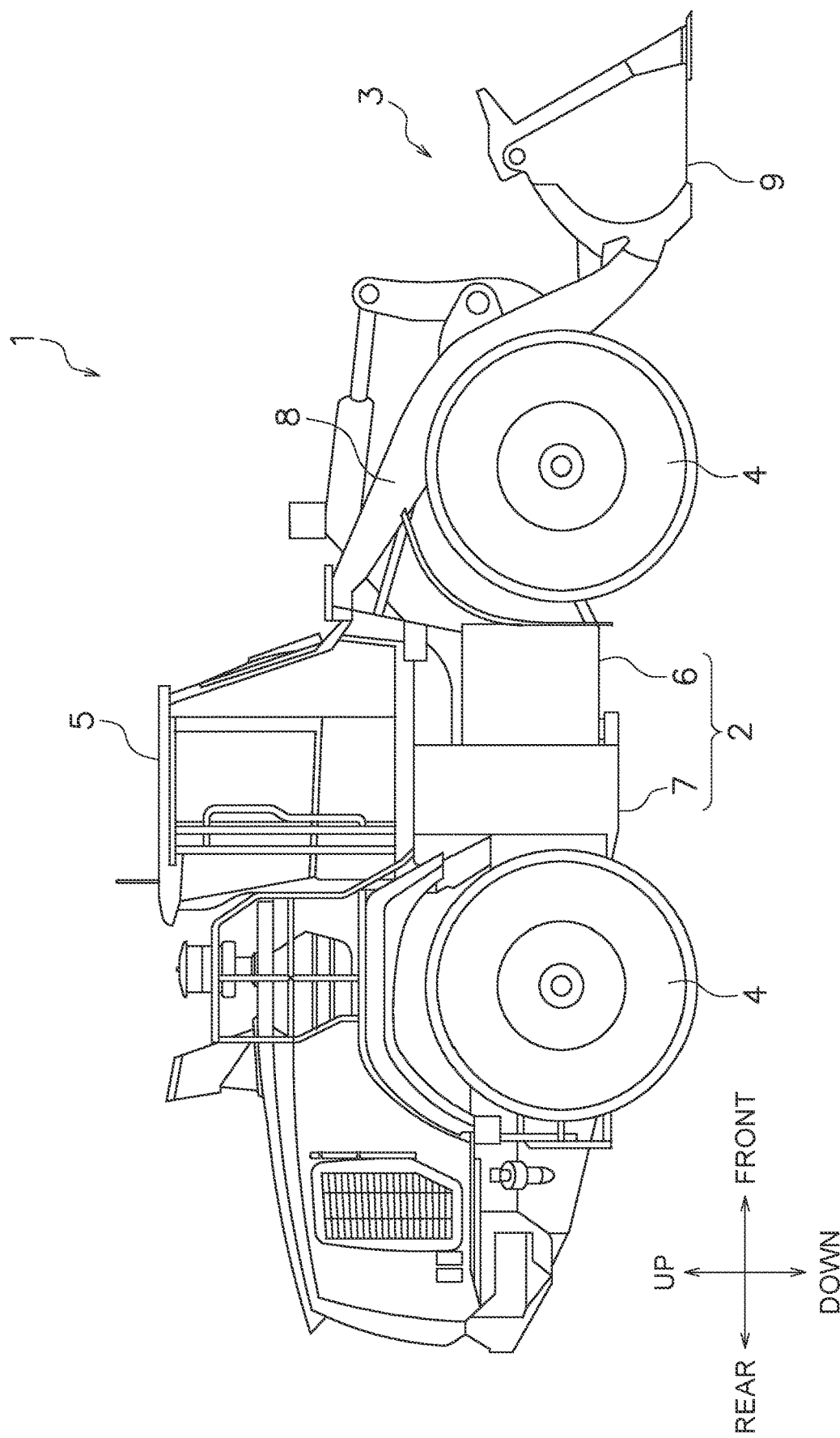
FIG. 1 is a side view illustrating a configuration of a wheel loader according to an embodiment.

FIG. 1 is a side view of a configuration of the wheel loader 1 according to an embodiment.

The wheel loader 1 is provided with a vehicle body frame 2, a work implement 3, a plurality of traveling wheels 4, and a cab 5.

The vehicle body frame 2 is an articulated type and includes a front frame 6 and a rear frame 7. The front frame 6 is disposed in front of the rear frame 7.

The work implement 3 is mounted to a front part of the front frame 6. The work implement 3 has a boom 8 and a bucket 9. The boom 8 is rotatably attached to the vehicle body frame 2. The bucket 9 is rotatably attached to the tip of the boom 8. The wheel loader 1 is provided with a hydraulic fluid pump (not illustrated) that discharges hydraulic fluid for driving the work implement 3. Various types of pumps such as a gear pump or a piston pump can be used as the hydraulic fluid pump.

A pair of the traveling wheels 4 are attached to the left and right of the front frame 6. A pair of the traveling wheels 4 are also attached to the left and right of the rear frame 7.

The cab 5 is disposed on the rear frame 7. The operator's seat, various operating members, and a display device, etc. are disposed inside the cab 5.

Figure 2:
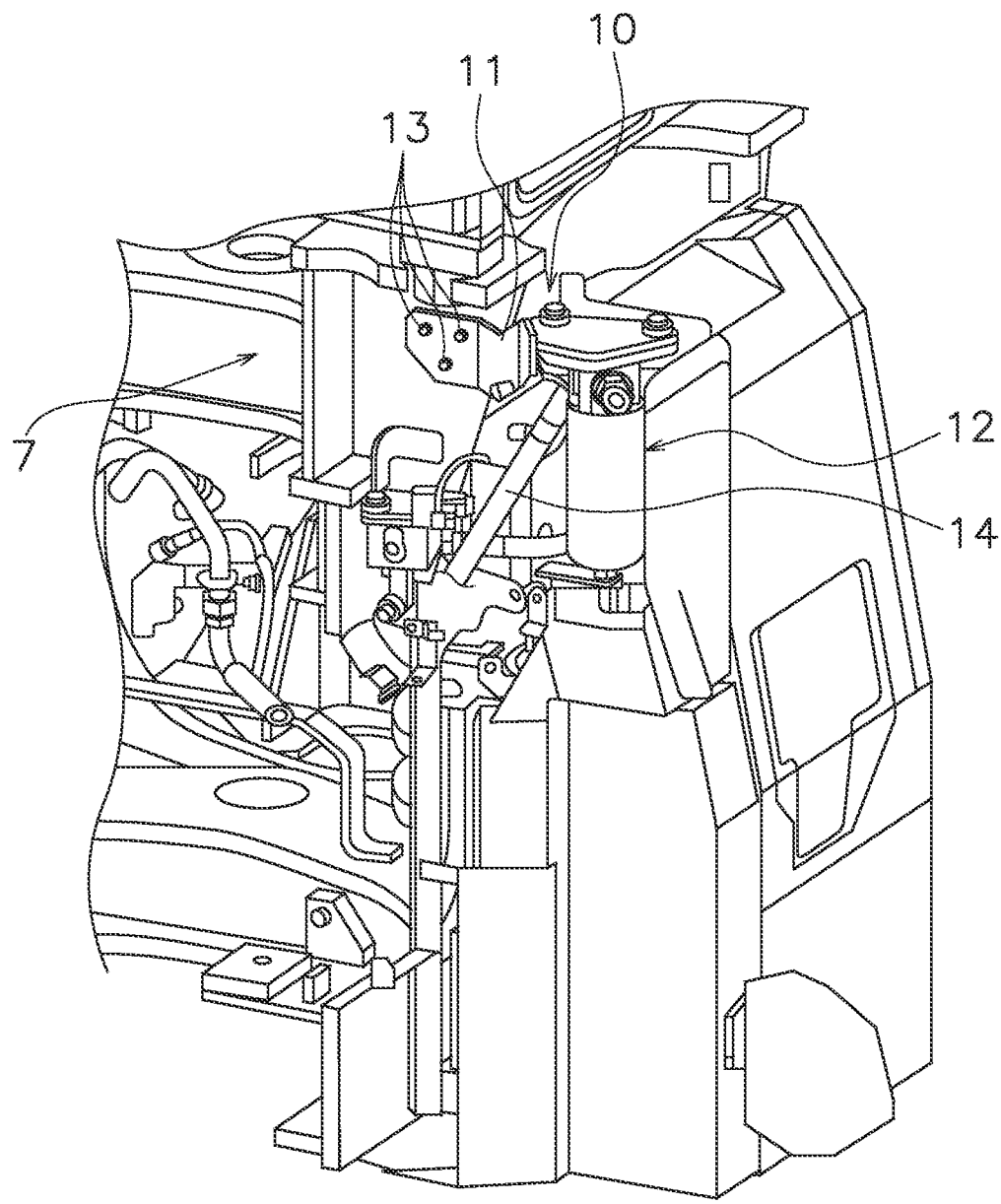
FIG. 2 is a perspective view illustrating an internal structure of the wheel loader according to the embodiment.
Figure 2:
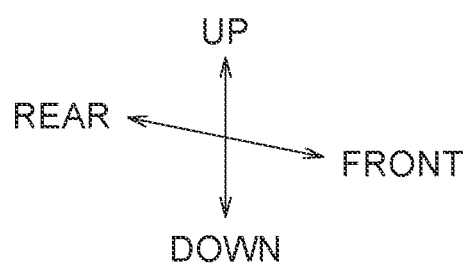

FIG. 2 is a perspective view illustrating an internal structure of the wheel loader 1 below the cab 5.

The wheel loader 1 is provided with a filter attachment body 10. The filter attachment body 10 is attached to the rear frame 7. The filter attachment body 10 may be attached to the vehicle body of the wheel loader 1. The vehicle body of the wheel loader 1 signifies a portion other than the work implement 3 and the traveling wheels 4. The filter attachment body 10 may be covered by a cladding plate of the wheel loader 1 or may be exposed to the outside of the wheel loader 1.

The filter attachment body 10 has a bracket 11 and a filter device 12.

The bracket 11 is attached to the rear frame 7. The bracket 11 is fixed directly to the rear frame 7 with bolts 13. However, the method for attaching the bracket 11 is not limited thereto.

The filter device 12 is attached to the bracket 11. The filter device 12 is connected to the unillustrated hydraulic fluid pump via a hydraulic pressure pipe 14. Hydraulic pressure pulsations are transmitted to the filter device 12 when the hydraulic fluid pump discharges the hydraulic fluid.

Configuration of Filter Attachment Body 10

Figure 3:
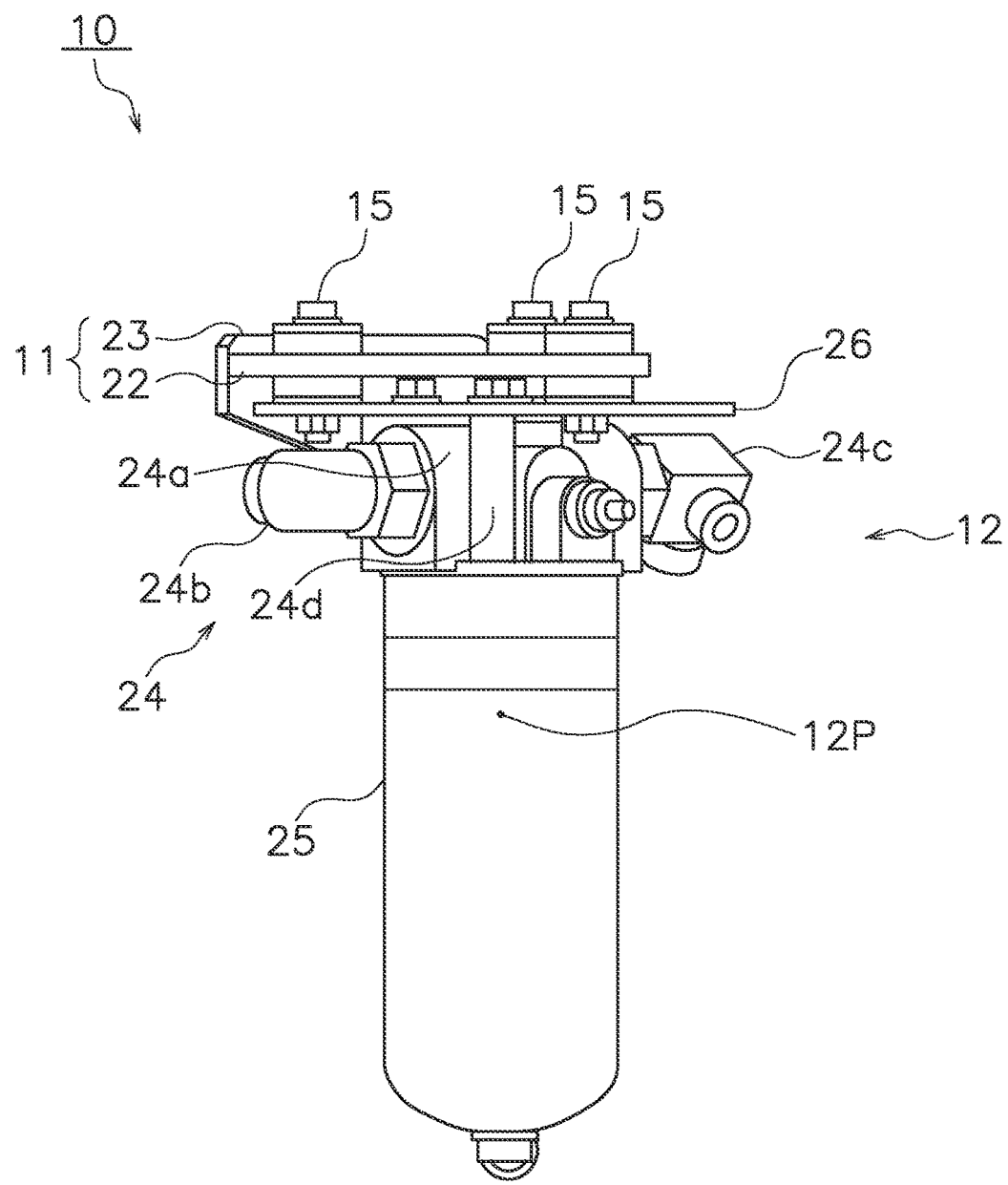
FIG. 3 is a side view illustrating a configuration of a filter attachment body according to the embodiment.
Figure 4:
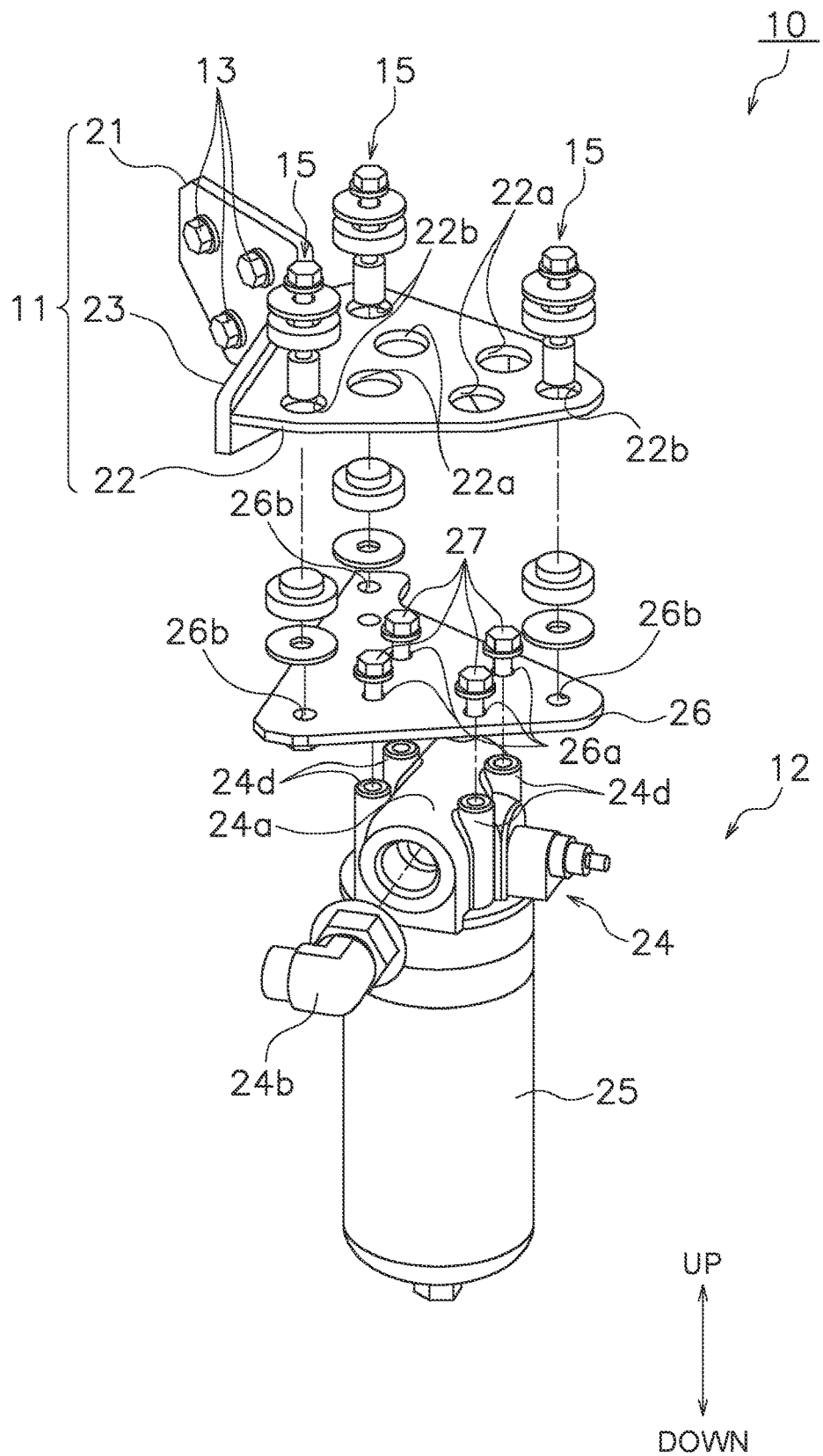
FIG. 4 is an exploded perspective view illustrating a configuration of the filter attachment body according to the embodiment.

FIG. 3 is a side view illustrating a configuration of the filter attachment body 10. FIG. 4 is an exploded perspective view illustrating a configuration of the filter attachment body 10.

The filter attachment body 10 has three sets of attachments 15 in addition to the abovementioned bracket 11 and the filter device 12.

Bracket 11

The bracket 11 has a first attachment plate 21, a second attachment plate 22, and an intermediate part 23.

The first attachment plate 21 is fixed to the rear frame 7 with the bolts 13. The first attachment plate 21 is formed in the shape of a flat plate. While the first attachment plate 21 according to the present embodiment is disposed perpendicular to the horizontal direction, the disposition thereof is not limited. The shape and size of the first attachment plate 21 may be changed as appropriate.

The second attachment plate 22 is an example of an "attachment plate" according to the present invention. The second attachment plate 22 is attached to the filter device 12 via the three attachments 15. The second attachment plate 22 is formed in the shape of a flat plate. The second attachment plate 22 is disposed substantially perpendicular to the up-down direction. The second attachment plate 22 extends substantially in the horizontal direction. As seen in a side view, the angle formed by the second attachment plate 22 with respect to the horizontal direction is preferably five degrees or less. Four through-holes 22a and three through-holes 22b are formed in the second attachment plate 22. The four through-holes 22a are holes for inserting four bolts 27 described below. The three through-holes 22b are holes for mounting the three attachments 15 described below. The shape and size of the second attachment plate 22 may be changed as appropriate.

The intermediate part 23 is joined to the first attachment plate 21 and the second attachment plate 22. The shape and size of the intermediate part 23 may be changed as appropriate.

Filter Device 12

The filter device 12 has a filter case 24, a filter body 25, a plate 26, and the four bolts 27.

The filter case 24 has a case body 24a, a first pipe connecting part 24b, a second pipe connecting part 24c, and four bosses 24d. The case body 24a is disposed on the filter body 25. An oil path linked to the filter body 25 is formed inside the case body 24a. The first pipe connecting part 24b is attached to the case body 24a. An unillustrated hydraulic pressure pipe is connected to the first pipe connecting part 24b. The second pipe connecting part 24c is attached to the case body 24a. The hydraulic pressure pipe 14 (see FIG. 2) is connected to the second pipe connecting part 24c.

The filter body 25 has a cylindrical shape that extends in the up-down direction. The filter body 25 is disposed below the filter case 24. The filter body 25 is attached to the case body 24a. The filter body 25 can be attached to and detached from the case body 24a. When the filtering function of the filter body 25 has deteriorated, the filter body 25 can be replaced with a new filter body 25. As illustrated in FIG. 3, the center of gravity 12P of the filter device 12 is located in the filter body 25.

The plate 26 is a member for attaching the three attachments 15 to the filter device 12. The plate 26 is disposed between the second attachment plate 22 of the bracket 11 and the filter case 24. The plate 26 is formed in the shape of a flat plate. The plate 26 is disposed substantially parallel to the second attachment plate 22 of the bracket 11. The shape and size of the plate 26 may be changed as appropriate. Four through-holes 26a and three through-holes 26b are formed in the plate 26. The three through-holes 26b are located outside of the four through-holes 26a.

The four bolts 27 are an example of the "plurality of second coupling members" according to the present invention. The four bolts 27 couple the plate 26 and the filter case 24. The four bolts 27 are inserted through the four through-holes 26a of the plate 26 and are fastened to the four bosses 24d of the filter case 24. While four bolts 27 are used in the present embodiment, the number of the bolts 27 may be changed as appropriate.

Attachments 15

Figure 5:
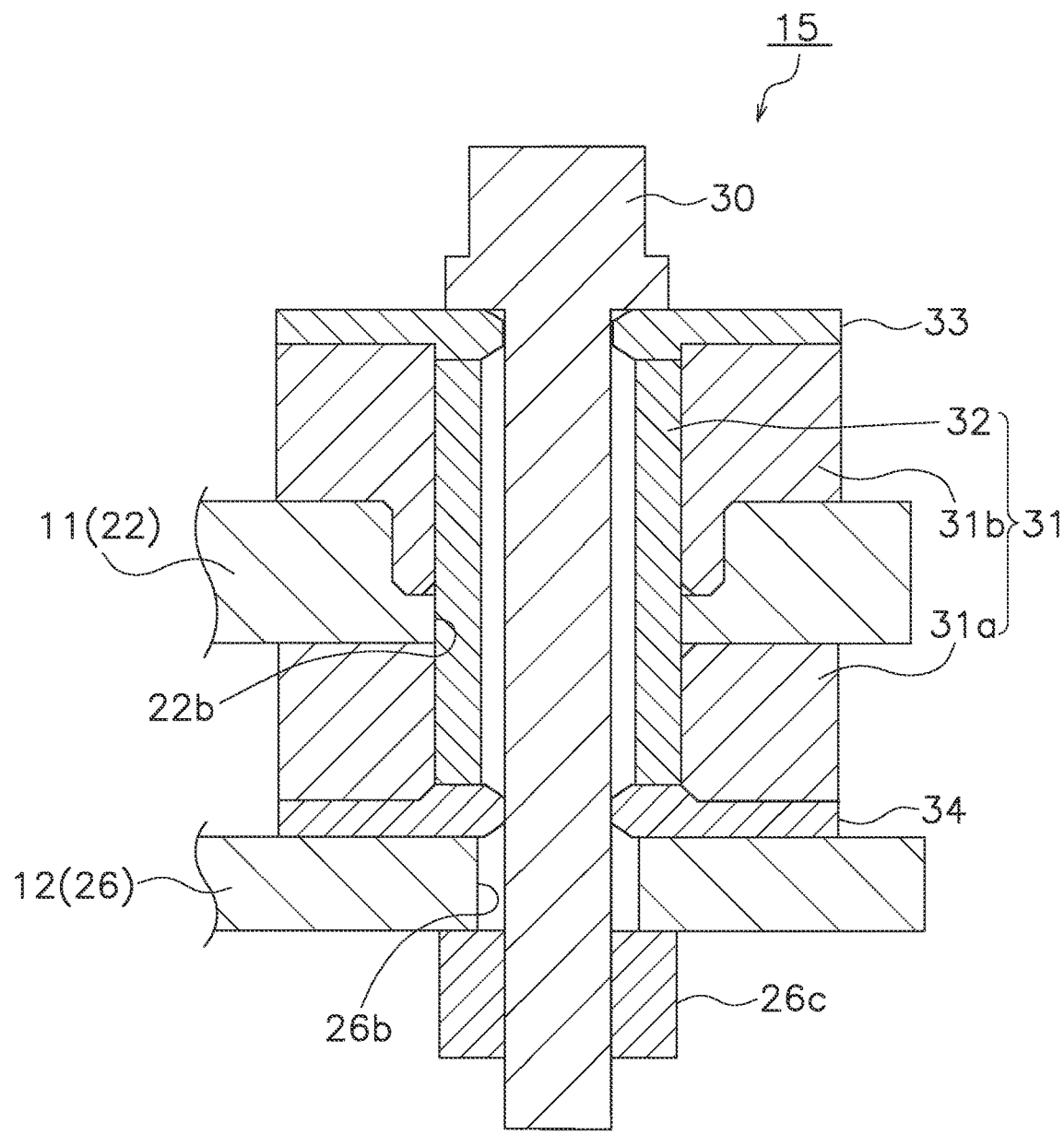
FIG. 5 is a cross-sectional view illustrating a configuration of an attachment according to the embodiment.

The three sets of attachments 15 are members for attaching the filter device 12 to the bracket 11. FIG. 5 is a cross-sectional view illustrating a configuration of the attachments 15. As illustrated in FIG. 5, the attachment 15 has a bolt 30 and an elastic member 31.

The bolt 30 is an example of the "first coupling member" according to the present invention. The bolt 30 couples the second attachment plate 22 of the bracket 11 and the plate 26 of the filter device 12 via the elastic members 31. The bolt 30 is inserted into a collar 32 and the through-hole 26b of the plate 26. The top part (upper end part) of the bolt 30 is disposed on the elastic member 31 via a washer 33. The lower end part of the bolt 30 is fastened to a nut 26c fixed at the lower surface of the plate 26.

The elastic members 31 are formed in an annular shape or a cylindrical shape. The elastic members 31 are interposed between the bracket 11 and the filter device 12. The elastic members 31 not only suppress the transmission of vibrations from the filter device 12 to the bracket 11, but also suppress the vibration of the filter device 12 itself. The elastic members 31 may be configured of a synthetic rubber such as chloroprene rubber, but are not limited in this way.

In the present embodiment, the elastic member 31 includes a first elastic part 31a, a second elastic part 31b, and the collar 32.

The first elastic part 31a is disposed between the second attachment plate 22 and the plate 26. In the present embodiment, the first elastic part 31a is sandwiched between the second attachment plate 22 and a washer 34 because the washer 34 is disposed on the plate 26. The second elastic part 31b is disposed between the second attachment plate 22 and the top part of the bolt 30. In the present embodiment, the second elastic part 31b is sandwiched between the second attachment plate 22 and the washer 33 because the washer 33 is disposed between the top part of the bolt 30 and the elastic member 31. In this way, workability when assembling the attachments 15 can be improved because the elastic member 31 is configured by two elastic parts in the present embodiment. However, the elastic member 31 may include one elastic part or may include three or more elastic parts.

The collar 32 is inserted through the first elastic part 31a, the second elastic part 31b, and the second attachment plate 22. The bolt 30 is inserted inside the collar 32. The collar 32 is disposed between the plate 26 and the top part of the bolt 30. The collar 32 is sandwiched between the washer 33 and the washer 34. The collar 32 suppresses the entire elastic member 31 from being excessively crushed. The collar 32 can be configured by a metal material such as steel, but is not limited in this way.

Top View of Second Attachment Plate 22

Figure 6:
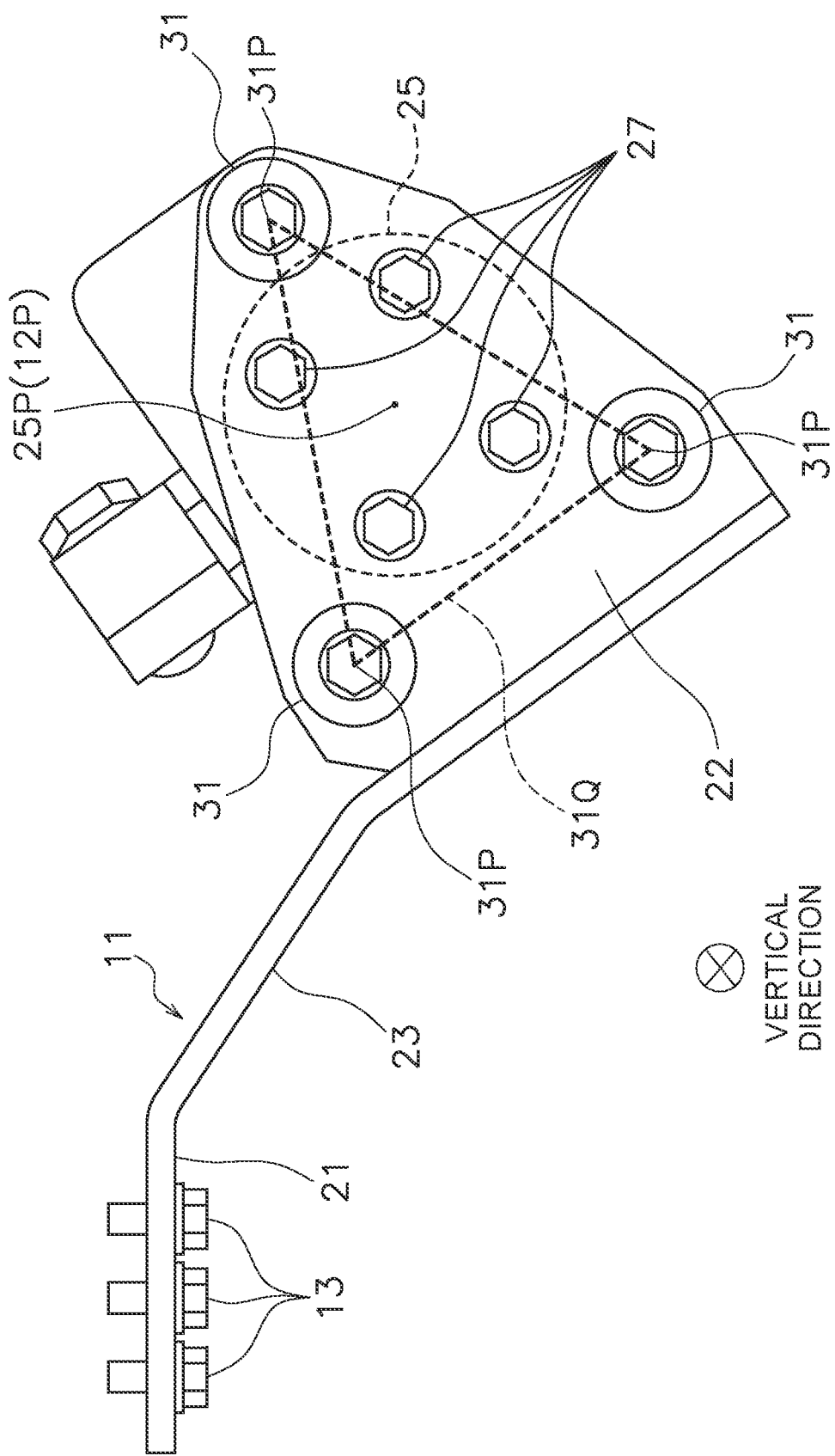
FIG. 6 is a top view of a second attachment plate according to the embodiment.

FIG. 6 is a top view of the second attachment plate 22.

A FIG. 31Q is drawn when respective geometric centers 31P of the three elastic members 31 are linked by straight lines when viewed from the top view of the attachment plate 22. In the present embodiment, the FIG. 31Q, which is drawn by linking the respective geometric centers 31P of the three elastic members 31 with straight lines, assumes a triangular shape because three elastic members 31 are disposed.

A geometric center 25P of the filter body 25 overlaps the FIG. 31Q when viewed from the top view of the attachment plate 22. Moreover, the three elastic members 31 are each located outside of the filter body 25 in the top view of the second attachment plate 22. As a result, the vibrations of the filter device 12 can be widely received over the range of the FIG. 31Q, whereby the transmission of the vibrations of the filter device 12 to the bracket 11 can be effectively suppressed even when the filter device 12 vibrates due to hydraulic pressure pulsations. Moreover, the compression of a portion of the elastic members 31 can be suppressed because the vibrations of the filter device 12 are received over the range of the FIG. 31Q. As a result, the vibrations of the filter device 12 itself can be effectively suppressed.

The center of gravity 12P (see FIG. 3) of the filter device 12 overlaps the FIG. 31Q when viewed from the top view of the attachment plate 22. As a result, the transmission of the vibrations of the filter device 12 to the bracket 11 can be even more effectively suppressed and the vibration of the filter device 12 can be more effectively suppressed.

The matter of a certain object "overlapping the FIG. 31Q" is a concept that includes the object being located inside the FIG. 31Q and the object being located on the outer edge of the FIG. 31Q.

Moreover, the four bolts 27 are located inside of the filter body 25 when viewed from the top view of the attachment plate 22. In this way, even when the four bolts 27 are disposed in a narrow range, the three elastic members 31 can be disposed well apart from each other due to the plate 26 being interposed as described above. As a result, the size of the filter device 12 can be made smaller because the four bosses 24d can be disposed in a compact manner to the filter case 24.

Other Embodiments

Although an embodiment of the present invention has been described so far, the present invention is not limited to the above embodiment and various modifications may be made within the scope of the invention.

(A) While the filter attachment body 10 has three sets of attachments 15 in the above embodiment, the present invention is not limited in this way. The filter attachment body 10 may have two or more sets of attachments 15. For example, when the filter attachment body 10 has two sets of attachments 15, the FIG. 31Q is drawn as a "straight line" when linking the respective geometric centers 31P of the two elastic members 31 with a straight line when viewed from the top view of the attachment plate 22. In addition, when the filter attachment body 10 has five sets of attachments 15, the FIG. 31Q is drawn as a "five-sided shape" when linking the respective geometric centers 31P of the five elastic members 31 with straight lines when viewed from the top view of the attachment plate 22.

(B) While the FIG. 31Q is drawn by linking the respective geometric centers 31P of the three elastic members 31 with straight lines as illustrated in FIG. 6 in the above embodiment, the present invention is not limited in this way. For example, the FIG. 31Q may be drawn by linking the respective outermost edges of the three elastic members 31 with straight lines.

(C) While the three elastic members 31 are each located outside of the filter body 25 when viewed from the top view of the attachment plate 22 in the above embodiment, the present invention is not limited in this way. At least one elastic member 31 of the three elastic members 31 may be located outside of the filter body 25 when viewed from the top view of the attachment plate 22. Moreover, it is not necessary for all of the elastic members 31 to be located outside of the filter body 25 and at least a portion of the elastic members 31 may be positioned outside of the filter body 25.

(D) While the filter device 12 has the plate 26 in the above embodiment, the present invention is not limited in this way. The plate 26 may not be used so long as three bosses 24d are provided to the filter case 24 so as to correspond to the positions of the three elastic members 31.

(E) While the attachments 15 each have the collar 32, the washer 33, and the washer 34 in the above embodiment, said members may be used optionally.

(F) While the wheel loader 1 has been explained as an example of the work vehicle in the above embodiment, the filter attachment body 10 according to the present invention is widely applicable to other work vehicles such as a forklift.

(G) While the filter attachment body 10 is connected to the hydraulic fluid pump in the above embodiment, the present invention is not limited in this way. The filter attachment body 10 can be widely applied to any pump that discharges a fluid. Therefore, the filter attachment body 10 can be applied not only to a pump that discharges a liquid such as a hydro-static transmission (HST) hydraulic pump, a fuel pump, a urea water pump, or a water pump, but may also be applied to a pump that discharges a gas.

What is claimed is:

1. A filter attachment body attached to a vehicle body of a work vehicle provided with a pump, the filter attachment body comprising:
   a bracket attached to the vehicle body;
   a filter device attached to the bracket; and
   a plurality of elastic members interposed between the bracket and the filter device;
   the bracket having an attachment plate to which the filter device is attached,
   the attachment plate being disposed substantially perpendicular to an up-down direction, the filter device having
- a filter case connected to the pump,
- a filter body attached to the filter case,
- a plate disposed between the attachment plate and the filter case, and
- a plurality of second coupling members that couple the plate and the filter case, and a geometric center of the filter body overlapping a figure drawn by linking each of the plurality of elastic members with straight lines when viewed from a top view of the attachment plate, at least a portion of at least one of the plurality of elastic members being located outside of the filter body when viewed from the top view of the attachment plate, and the plurality of second coupling members being located inside of the filter body when viewed from the top view of the attachment plate.

2. The filter attachment body according to claim 1, further comprising:
- a plurality of first coupling members that couple the bracket and the filter device via the plurality of elastic members, each of the plurality of elastic members having
- a first elastic part disposed between the bracket and the filter device, and
- a second elastic part disposed between the bracket and a respective one of the plurality of first coupling members.

3. The filter attachment body according to claim 1, wherein
a center of gravity of the filter device overlaps the figure when viewed from the top view of the attachment plate.

4. The filter attachment body according to claim 1, wherein
the figure is a figure drawn by linking respective geometric centers of the plurality of elastic members with straight lines.

5. A work vehicle including the filter attachment body according to claim 1, the work vehicle further comprising:
- a vehicle body;
- a work implement attached to the vehicle body; and
- a pump configured to supply hydraulic fluid to the work implement.

* * * * *